United States Patent
Schulz et al.

(10) Patent No.: US 7,403,217 B2
(45) Date of Patent: Jul. 22, 2008

(54) SYSTEM AND METHOD OF SELF-DISCOVERY AND SELF-CALIBRATION IN A VIDEO CONFERENCING SYSTEM

(75) Inventors: Dieter Schulz, Ottawa (CA); Graham Thompson, Kanata (CA); Charn Leung (David) Lo, Ottawa (CA); Rafik Goubran, Ottawa (CA); Marco Nasr, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 739 days.

(21) Appl. No.: 11/027,234

(22) Filed: Dec. 30, 2004

(65) Prior Publication Data
US 2005/0140779 A1    Jun. 30, 2005

(30) Foreign Application Priority Data
Dec. 31, 2003  (GB) ................... 0330253.6

(51) Int. Cl.
*H04N 7/14* (2006.01)
(52) U.S. Cl. ............. 348/14.05; 348/14.08; 348/14.01; 348/169
(58) Field of Classification Search ... 348/14.01–14.08, 348/14.09, 14.1, 14.11–14.16, 169
See application file for complete search history.

(56) References Cited

U.S. PATENT DOCUMENTS

| | | | |
|---|---|---|---|
| 6,593,956 B1 * | 7/2003 | Potts et al. | 348/14.09 |
| 6,940,540 B2 | 9/2005 | Beal et al. | |
| 2003/0184645 A1 * | 10/2003 | Biegelsen et al. | 348/14.1 |

FOREIGN PATENT DOCUMENTS

| | | |
|---|---|---|
| EP | 1205762 A1 | 5/2002 |
| EP | 1377057 A2 | 1/2004 |
| JP | 2003163908 A | 6/2003 |

OTHER PUBLICATIONS

Wilson, Kevin W.; Darrell, Trevor, "Audio-video array source localization for intelligent environments", Proceedings of IEEE ICASSP, 2002.
Khang, Zhengyou, "A flexible new technique for camera calibration", Pattern Analysis and Machine Intelligence, IEEE Transactions, vol. 22, No. 11 , Nov. 2000, pp. 1330-1334.
Heikkila, Janne and Silven, Olli, "A four-step camera calibration procedure with implicit image correction". Computer Vision and Pattern Recognition, 1997 Proceedings, 1997 IEEE Computer Society Conference, pp. 1106-1112.
Lo, Charn Leung, "Biaxial strain study of porcine aortic valve using stereographic technique," Faculty of Graduate Studies, University of Western Ontario, London, Ontario, Canada, Sep. 1994.

* cited by examiner

*Primary Examiner*—Melur Ramakrishnaiah
(74) *Attorney, Agent, or Firm*—Michelle Whittington, Esq.

(57) ABSTRACT

A method of self-discovery and self-calibration is provided for allowing arbitrary placement of audio and video components in a multimedia conferencing system. In particular, one or more markers are provided on the audio components (e.g. microphone arrays, etc.) that are detectable by the video components (e.g. cameras). A unique signature (e.g. flashing sequence, color, etc.) characterizes each marker so that its exact location relative to the camera may be calculated. A self-calibration operation is then performed to relate, regulate and standardize dimensions and locations in the conferencing environment to the video system.

10 Claims, 4 Drawing Sheets

SYSTEM AND METHOD OF SELF-DISCOVERY AND SELF-CALIBRATION IN A VIDEO CONFERENCING SYSTEM

FIELD OF THE INVENTION

The present invention relates in general to video conferencing systems, and more particularly to a method of self-discovery and self-calibration of video and audio elements in a video conferencing system.

BACKGROUND OF THE INVENTION

In a multimedia conferencing system comprising one or more steerable video cameras and microphones, the relative positions and orientation of the video and audio components must be known in advance of a call in order to initialize the system. Specifically, the location of sources of directional information such as microphone(s) and microphone array(s) relative to camera(s) must be established prior to a video conference call to ensure proper steering of the camera(s) by the talker location signal(s) output from the microphone(s), microphone array(s), etc.

In the past, the location of the camera(s) relative to the microphone array(s) has been rigid and tightly controlled, in order to facilitate the calibration process. More particularly, in the past, microphones and cameras have been mounted on walls and ceilings to provide a known, consistent relative positioning of microphone(s) and camera(s). This type of rigid setup is undesirable where portability of some components (e.g. camera(s)) is required or in small offices where space is at a premium.

Several prior art references disclose the use of fixed location video cameras, microphones and/or microphone arrays, as follows:

K. Wilson, T. Darrell, "Audio-video array source localization for intelligent environments", Proceedings of IEEE ICASSP, 2002;

Zhang, Z., "A flexible new technique for camera calibration", Pattern Analysis and Machine Intelligence, IEEE Transactions on, Volume: 22 Issue: 11, November 2000 Page(s): 1330-1334;

Heikkila, J.; Silven, O., "A four-step camera calibration procedure with implicit image correction". Computer Vision and Pattern Recognition, 1997. Proceedings., 1997 IEEE Computer Society Conference on, 1997 Page(s): 1106-1112; and Lo D., "Biaxial strain study of porcine aortic valve using stereographic technique." Faculty of Graduate Studies, University of Western Ontario, London, Ont. 1994.

SUMMARY OF THE INVENTION

According to the present invention, a method of self-discovery and self-calibration is provided for allowing arbitrary placement (both position and orientation) of audio and video components in a multimedia conferencing system. In particular, one or more markers are provided on the audio components (e.g. microphone arrays, etc.) that are detectable by the video components (e.g. cameras). A unique signature (e.g. flashing sequence, color, etc.) characterizes each marker so that its exact location relative to the camera may be calculated. A self-calibration operation is then performed to relate, regulate and standardize dimensions and locations in the conferencing environment to the video system.

BRIEF INTRODUCTION TO DRAWINGS

A detailed description of the preferred embodiment is set forth in detail below, with reference to the following drawings, in which.

DETAILED DESCRIPTION OF THE PREFERRED EMBODIMENT

Figure 1:
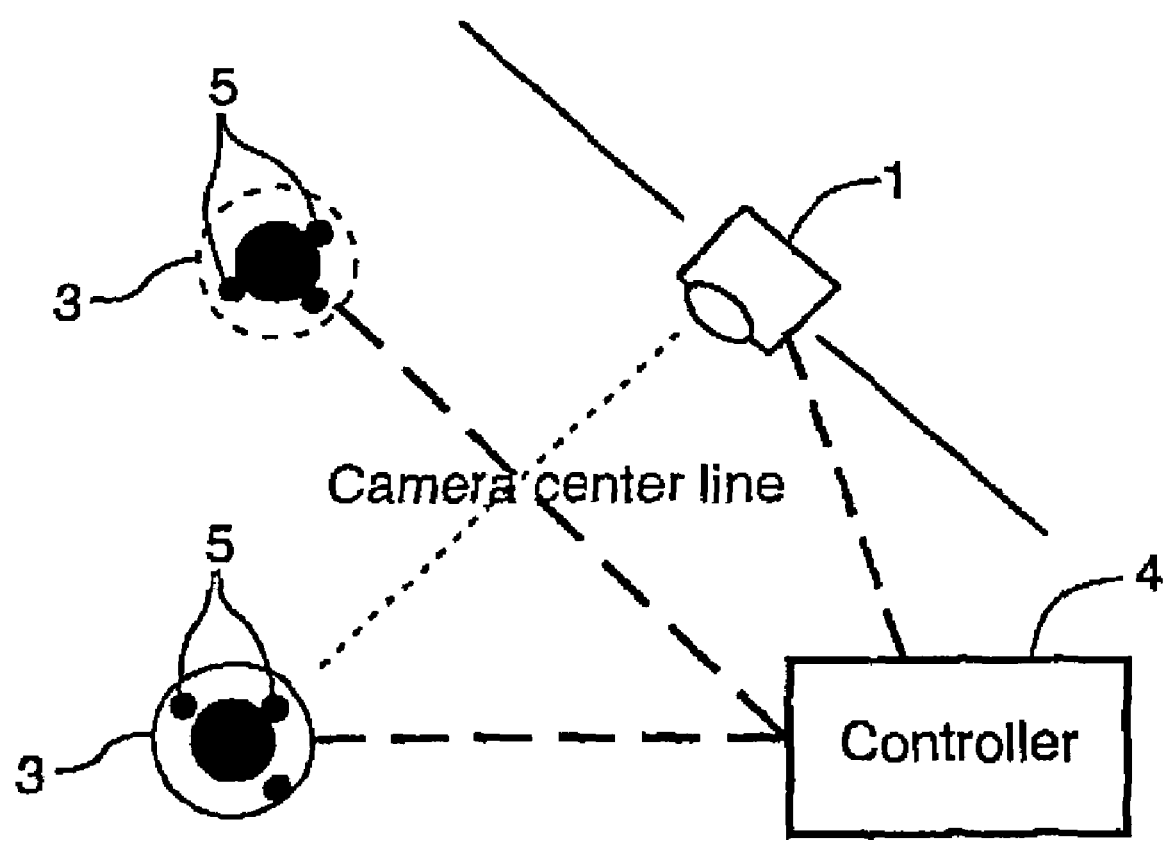
FIG. 1 is a block diagram of a conferencing system configured for self-discovery and self-calibration system according to the present invention.

Turning to FIG. 1, a conferencing system is shown comprising a video camera 1 and at least one microphone array 3 (two such microphone arrays being depicted for explanatory purposes) connected to a video conferencing controller 4. However, any number of cameras and microphones and/or microphone arrays may be provided, depending on the conferencing application. The principles of the present invention apply irrespective of the configuration and number of conferencing devices. Controller 4 may be a dedicated hardware device, a PC, a PBX, or any other suitable electronic apparatus known in the art.

One or more participants to a conference (not shown) may be located randomly in the conferencing environment. When one of the participants speaks (i.e. the talker), the microphone array 3 determine in which sector of the 360° field of view the talker is located in. Such beamforming techniques are well known in the art. The location information is then transmitted to controller 4 which, in response, causes the video camera 1 to pan or tilt so as to capture the image of the talker.

As discussed above, unless the relative disposition of the video camera 1 and the microphone array 3 is known in advance, the controller 4 is unable to direct the camera toward the talker. Thus, according to a first aspect of the present invention a self-discovery procedure is provided to locate the relative position of components (e.g. microphone arrays and cameras) that are placed arbitrarily in the conferencing environment. Specifically, each component is provided with a plurality of markers 5 that are visible to the camera 1. In a multi-camera system, each camera is also provided with one or more markers to enable the relative positions of the cameras to be determined, as well. Although FIG. 1 shows multiple markers 5 per component 3, only a single marker is required to perform the self-discovery process.

Each marker 5 generates its own unique signature. In one embodiment, the markers 5 are LEDs (or IR-LEDs) placed on the microphone arrays 3 (as indicated above, there need not be multiple arrays), that are caused to flash in accordance with respective predetermined signatures (e.g. a special flashing sequence, such as flashing the IP address of the component, physical characteristics the use of which is described below, or the provision of LEDs in different colors, etc.). For example, a device with an IP address of 10.10.0.173 the LED markers 5 may be caused to flash with a series of eight short, equally-spaced flashes or non-flashes corresponding to the binary representation of the last portion of the IP address (in this case, "10101101"). This sequence would then be repeated, with a pause of a pre-set length between sequences. Alternatively, the LEDs 5 may be caused to flash the full IP address.

Visible or infra red light is used in the preferred embodiment, not only because of the low cost due to capitalizing on necessary operational components and features of an the AV system, e.g. PTZ video camera and indicator LEDs. More importantly, light, including IR, is preferred over RF or other media because it best comprehends the bounds of a typical meeting room. For example it is not likely that a camera in one conference room will pick up an LED in an adjacent room. This is in contrast to RF or magnetic means, or even, to a degree, sonic means.

The IP address is also and important aspect of the preferred embodiment when used in a working environment wherein the video equipment is required to be portable. Because the IP address of each piece of equipment is unique within a given network, the IP address provides a robust means of associating mobile equipment with other equipment (fixed or mobile) to form a working association.

The camera 1 is instructed by controller 4 to do a search for a specific marker signature in the conferencing environment. Once the specific marker 5 has been located, the camera 1 is caused to "zoom-in" for carrying out further confirmation. This confirmation is preferably in the form of identifying a different marker's signature on the same component 3. Alternatively, identification of known physical features of the component (i.e. by video shape recognition) may be performed.

Next, according to a second aspect of the invention, the controller 4 causes video camera 1 to perform a self-calibration process to relate, regulate and standardize dimensions and locations in the conferencing environment to the video system. To perform self-calibration, a set of markers 5 is provided on each component 3, which can be the same markers 5 used for self-discovery (as shown in FIG. 1) or a completely different set of markers, or indeed a combination of both self-location and self-calibration markers.

For self-calibration, the camera 1 is instructed by controller 4 to zoom-in (if not already zoomed-in) to the component 3 identified by the self-discovery process discussed above. The intrinsic physical parameters of the camera 1 (i.e. focal length, principal point, skew coefficient, and the lens distortions) are then determined by instructing the camera to observe the markers 5, capture the image thereof, and identify where the markers are in the image. The camera 1 is then panned and tilted slightly and the observation process is repeated. If the camera 1 has to ability to self-focus, the focal length of the camera can change depending on the video content. To compensate for such changes, the current setting of the camera lens can be read off from the camera and then mapped to the focal length calculated from the intrinsic parameters. When the camera changes its focus, the new value of the lens setting can be read off from the camera and then back calculates the correct focal length.

Using a single camera, as in FIG. 1, can result in loss of depth perception. Fortunately, because the dimension of the markers 5 is known, the depth information can be recovered by calibrating the image size of the markers (in pixels) to their actual size.

Thus, in operation, for the specific embodiment of FIG. 1, a plurality of LEDs 5 (or Infra Red LEDs) are placed asymmetrically on the array 3. A specific marker LED is caused by controller 4 to pulsate at a frequency Fp for a time interval Tp and then transmit the unique signature of the array (e.g. its IP address). The camera 1 detects the presence of the microphone array 3 by searching for the pulsating LED 5 on the microphone array. The detection speed is determined by the frequency Fp. However, increasing Fp increases the video processing computational requirement. Typical values of Fp range from 5 to 15 Hz.

Once camera 1 has detected the specific microphone array 3, image processing techniques are used to determine the exact location of the array within the image. Camera zoom is then used to improve the resolution. Given that the size of the microphone array is known, its actual size in the image along with the camera information (focal length and zoom factor) are used to determine the following information:

Center of the array 3 and its exact direction with respect to the camera 1

Distance between the camera 1 and the microphone array 3

Rotation of the array 3 (i.e. exact orientation of its zero degree azimuth reference)

Tilt of the array 3 with respect to the camera 1

The above parameters are calculated based on the geometry of the various markers 5 and components 3. The specific information transmitted by the component (e.g. IP address of a given microphone array) can be used to search a database to find its exact geometry (e.g. size, location of the markers, etc.) in the event that this information is not passed in the "signature"

Figure 2:
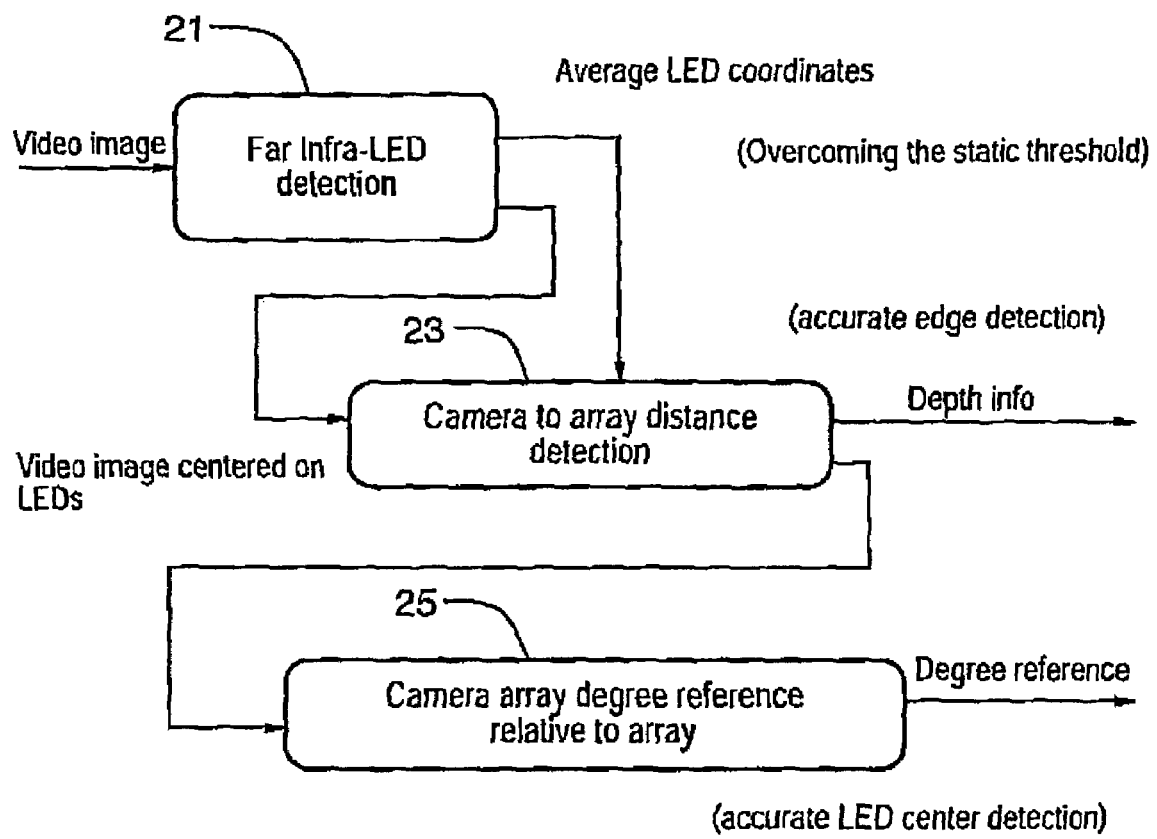
FIG. 2 is a block diagram depicting major functional blocks of the self-discovery and self-calibration system according to the present invention.

FIG. 2 is a high level state flow diagram of the location and calibration system according to the present invention. In the initial state "Far Infra-LED detection" 21, the camera 1 searches the room to determine whether an audio array 3 is present or not. When an array is found, the LED coordinates within the room are calculated and averaged. These coordinates are sent to the next state "Camera to array distance detection" 23, and the camera 1 zooms, focuses and centers the image based on these coordinates. By applying accurate edge detection, the distance from the camera 1 to the array 3 is determined and this depth information is stored in the controller 4. The algorithm moves to the next state "Camera array degree reference relative to array" 25, to determine the orientation of the array 3 relative to the camera position. By determining the position of the markers 5 within the image (accurate LED center detection), the rotation can be calculated. The rotation (Degree reference) is stored in the controller 4. Consequently, the relative position and rotation of the array 3 becomes known to the camera controller 4.

Figure 3:
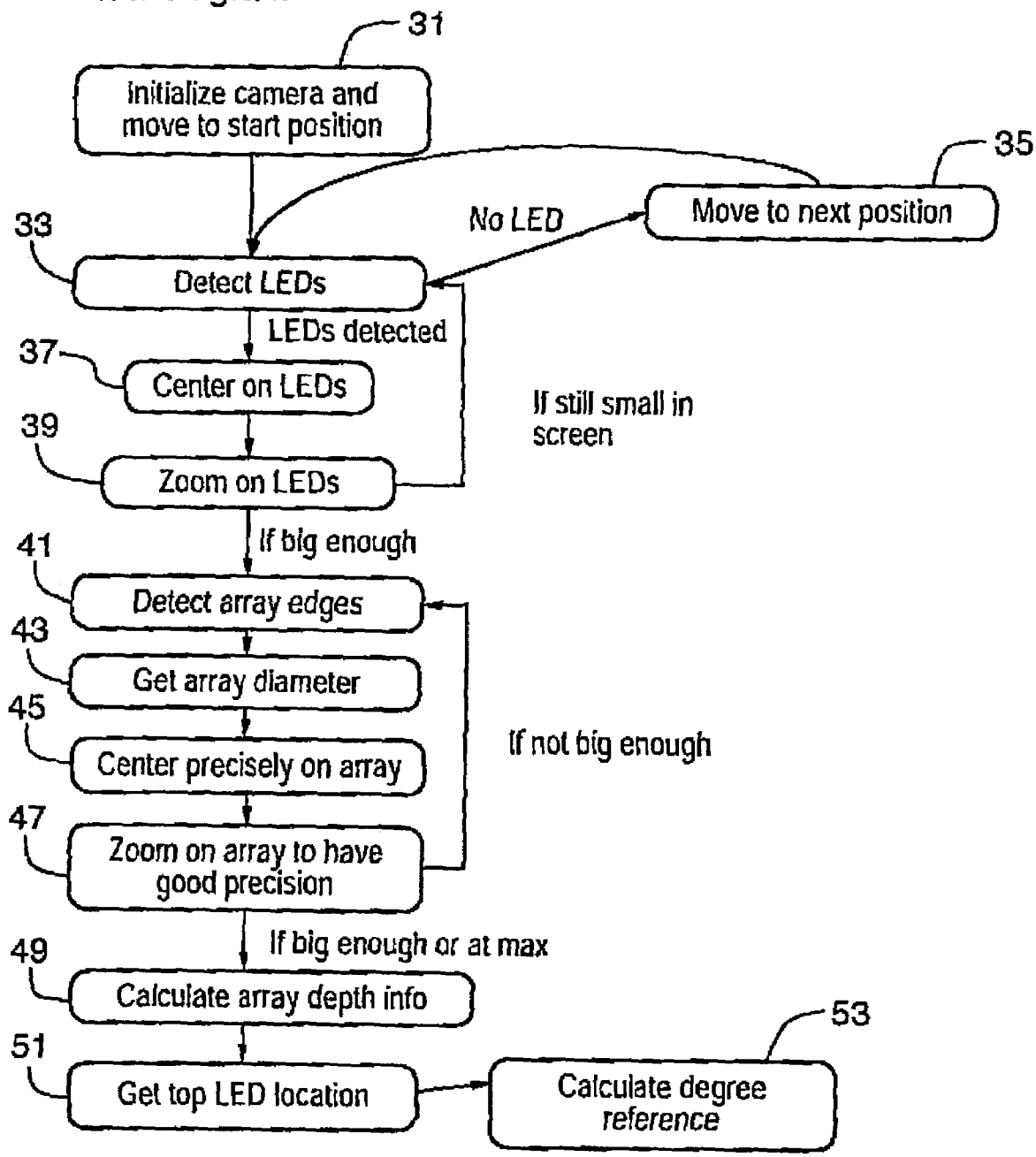
FIG. 3 is a flowchart showing the steps in implementing the self-discovery and self-calibration system of FIG. 2.

FIG. 3 is a more detailed flowchart of the process set forth in the Is state diagram of FIG. 2. The camera 1 is initialized to a start position at step 31, processes the image in its field of view, and determines whether the array signature is detected (step 33). If the array is not present in the current field of view, the camera moves to the next position (step 35) and the detection process is repeated (step 33). When a valid signature is detected, the coordinates are calculated and the camera 1 centers the image (step 37). Next, the camera 1 zooms in on the image to determine whether the size is in the correct order of magnitude (step 39). If not, a false detection is noted and control returns to steps 33 and 35. If the size is correct, the size and position is calculated more precisely using edge detection (step 41), the diameter is calculated (step 43). and the image is more accurately centered (step 45). If required, the camera zooms in even further for more accuracy (step 47). If the image is still too small for an accurate depth measurement, steps 41, 43, 45 and 47 are repeated until the image is big enough for an accurate measurement. The array distance (depth) is calculated and stored (step 49). The rotation relative to the camera position is calculated by determining the top LED (or marker) position (steps 51 and 53). The rotation (degree reference) is then stored.

Figure 4:
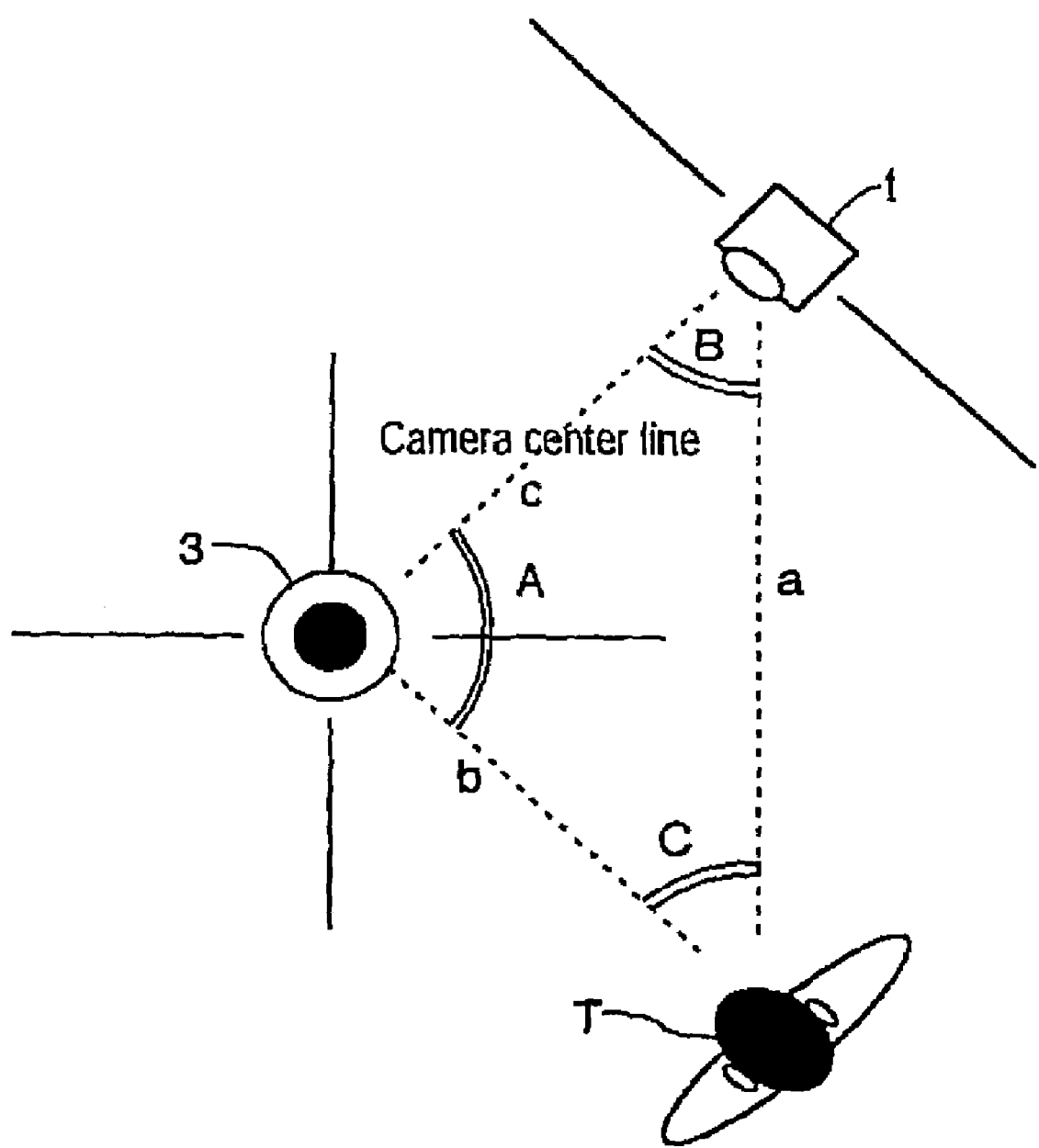
FIG. 4 is a block diagram depicting video angle calculation for the video-conferencing system of FIG. 1.

Turning now to FIG. 4, an angle calculation method is shown for determining the location of a talker T relative to camera 1 and microphone array 3. The microphone array determined which sector the talker T is located in, and passes this information to the controller 4 (not shown in FIG. 4). The camera angle calculation is performed within the controller based on cosine and sine law from the reference frame of the array 3. The available information is: A, b, c.

Therefore, $$a = \sqrt{b^2 + c^2 - 2bc\cos A}$$

such that:

$$\frac{\sin A}{a} = \frac{\sin B}{b}$$

Alternatives and variations of the invention are possible. Thus, whereas the preferred embodiment is described in terms of a conferencing system that uses microphone arrays, it will be appreciated that the principles of the invention may be extended to any source of directional information, including stand-alone microphones. Also, as an alternative to using LEDs or Ir-LEDs it is contemplated that ultra sound transducers may be provided on each component and time-of-flight principles used to find the distance between each transducer. The relative coordinates can then be computed for each component using either triangulation or optimization techniques or combination of both. Alternatively, by placing magnetic pickup components (e.g. coils) with known orientation (i.e. using three coils each 90 degree to each other forming an x,y,z axis) on each component, the strength of the magnetic field and the orientation of the pickup component can be measured so that the location and orientation of each component can be found. All such embodiments and variations are believed to be within the sphere and scope of the invention as defined by the claims appended hereto.

The invention claimed is:

1. A method of self-discovery of at least one video component in a multimedia conferencing system having at least one source of directional information, comprising:
    detecting the presence of at least one marker on said source of directional information;
    activating said marker to generate a unique signature for identifying said source of directional information;
    retrieving from a database physical characteristics of the identified source of directional information; and
    capturing an image of said source of directional information via said video component and determining the location of the source of directional information within the image based on said physical characteristics and in response determining the location of the source of directional information relative to the video component.

2. The method of claim 1, wherein said at least one marker is selected from the group comprising LEDs, IR-LEDs, ultra sound transducers, and magnetic pickup components.

3. The method of claim 1, wherein said unique signature comprises a marker flashing sequence.

4. The method of claim 1, wherein said unique signature comprises a marker color.

5. The method of claim 1, wherein said unique signature comprises the IP address of said source of directional information.

6. The method of claim 1, further comprising self-calibration of said video component to relate, regulate and standardize dimensions and locations of said components in the multimedia conferencing system.

7. The method of claim 6, wherein said self-calibration further comprises (i) capturing the image of said at least one marker via said video component, (ii) identifying the location of the marker in the image and in response (iii) determining intrinsic physical parameters of the video component, (iv) panning and tilting said video component and repeating steps (i) to (iii).

8. The method of claim 7, wherein said intrinsic physical parameters include at least one of focal length, principal point, skew coefficient, and the lens distortions.

9. The method of claim 1, wherein said step of determining the location of the source of directional information relative to the video component includes determining the center of the source of directional information and its exact direction with respect to the video component, the distance between the video component and the source of directional information, rotation of the source of directional information relative to the video component, and tilt of the source of directional information with respect to the video component.

10. The method according to any one of the preceding claims 1-9 wherein said source of directional information is a microphone or a microphone array.

* * * * *